United States Patent
Wong et al.

(10) Patent No.: US 9,441,982 B2
(45) Date of Patent: Sep. 13, 2016

(54) NAVIGATION SYSTEM WITH NON-NATIVE DYNAMIC NAVIGATOR MECHANISM AND METHOD OF OPERATION THEREOF

(71) Applicant: TeleNav, Inc., Sunnyvale, CA (US)

(72) Inventors: Shannph Wong, San Francisco, CA (US); Raj Rao, Newark, CA (US); Rudong Wang, Sunnyvale, CA (US); Richard Jingwen Yang, Mountain View, CA (US); Hongwei Feng, Palo Alto, CA (US)

(73) Assignee: Telenav, Inc., Santa Clara, CA (US)

( * ) Notice: Subject to any disclaimer, the term of this patent is extended or adjusted under 35 U.S.C. 154(b) by 97 days.

(21) Appl. No.: 13/647,299

(22) Filed: Oct. 8, 2012

(65) Prior Publication Data

US 2013/0096821 A1    Apr. 18, 2013

Related U.S. Application Data

(60) Provisional application No. 61/546,920, filed on Oct. 13, 2011.

(51) Int. Cl.
*G01C 21/00* (2006.01)
*G01C 21/36* (2006.01)

(52) U.S. Cl.
CPC ................. *G01C 21/3626* (2013.01)

(58) Field of Classification Search
CPC .... G06F 9/4443; G06F 9/44; G06F 17/3056; G06F 17/30575; G06F 17/3089; G06F 17/30958; G06F 2340/0435; G01C 21/3626
USPC ....... 701/120, 408, 409, 410, 411, 414, 420, 701/428, 431, 432, 434, 436, 446, 523; 455/456.1; 345/592, 520, 428; 342/357.31, 357.42, 357.43, 357.77
See application file for complete search history.

(56) References Cited

U.S. PATENT DOCUMENTS

| | | | |
|---|---|---|---|
| 2002/0115453 A1* | 8/2002 | Poulin et al. ................. | 455/456 |
| 2003/0060973 A1* | 3/2003 | Mathews et al. ............. | 701/209 |
| 2003/0163253 A1* | 8/2003 | Lee et al. ...................... | 701/209 |
| 2008/0046175 A1 | 2/2008 | Tengler et al. | |
| 2009/0143964 A1 | 6/2009 | Navone et al. | |
| 2009/0181695 A1* | 7/2009 | Wirola et al. ............. | 455/456.1 |
| 2009/0248397 A1* | 10/2009 | Garcia et al. .................... | 704/9 |
| 2010/0302056 A1 | 12/2010 | Dutton et al. | |
| 2011/0117878 A1* | 5/2011 | Barash et al. ............. | 455/404.2 |
| 2011/0258049 A1 | 10/2011 | Ramer et al. | |
| 2013/0006525 A1* | 1/2013 | Stroila .......................... | 701/434 |

FOREIGN PATENT DOCUMENTS

WO    2008140166 A1    11/2008

OTHER PUBLICATIONS

Peter Lubbers et al., "Pro HTML5 Programming, Powerful APIs for Richer Internet Application Development", published Aug. 31, 2010.*

The HandheldBlog: "Nokia's Ovi Maps on Android & iOS.", Jul. 11, 2011, XP054975372, Retrieved from the Internet: URL: http://www.youtube.com/watch?v=quMdtOJyQaQ [retrieved on Apr. 8, 2014].

Google:"Driving directions with Street View on Google Maps", Apr. 29, 2008, XP054975373, Retrieved from the Internet: URL: http://www.youtube.com/watch?v=dgJSXrkwshg [retrieved on Apr. 8, 2014].

* cited by examiner

*Primary Examiner* — Jelani Smith
(74) *Attorney, Agent, or Firm* — IP Investment Law Group

(57) ABSTRACT

A method of operation of a navigation system includes: receiving a destination; generating a route to the destination; and generating a non-native dynamic navigation based on the route for displaying on a device.

8 Claims, 10 Drawing Sheets

NAVIGATION SYSTEM WITH NON-NATIVE DYNAMIC NAVIGATOR MECHANISM AND METHOD OF OPERATION THEREOF

CROSS-REFERENCE TO RELATED APPLICATION

This application claims the benefit of U.S. Provisional Patent Application Ser. No. 61/546,920 filed Oct. 13, 2011 and U.S. Provisional Patent Application Ser. No. 61/615,855 filed Mar. 26, 2012, and the subject matter thereof is incorporated herein by reference thereto.

TECHNICAL FIELD

The present invention relates generally to a navigation system and more particularly to a system with non-native dynamic navigator mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other point of interest (POI). The real-time information provides invaluable relevant information. However, a navigation system that cannot provide relevant notification that relates to the destination has become a paramount concern for the consumer.

Thus, a need still remains for a navigation system with non-native dynamic navigator mechanism that improves providing non-native dynamic navigation to the destination. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a destination; generating a route to the destination; and generating a non-native dynamic navigation based on the route for displaying on a device.

The present invention provides a navigation system, including: a destination selection module for receiving a destination; a route generator module, coupled to the destination selection module, for generating a route to the destination; and a non-native dynamic navigation module, coupled to the route generator module, for generating a non-native dynamic navigation based on the route for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
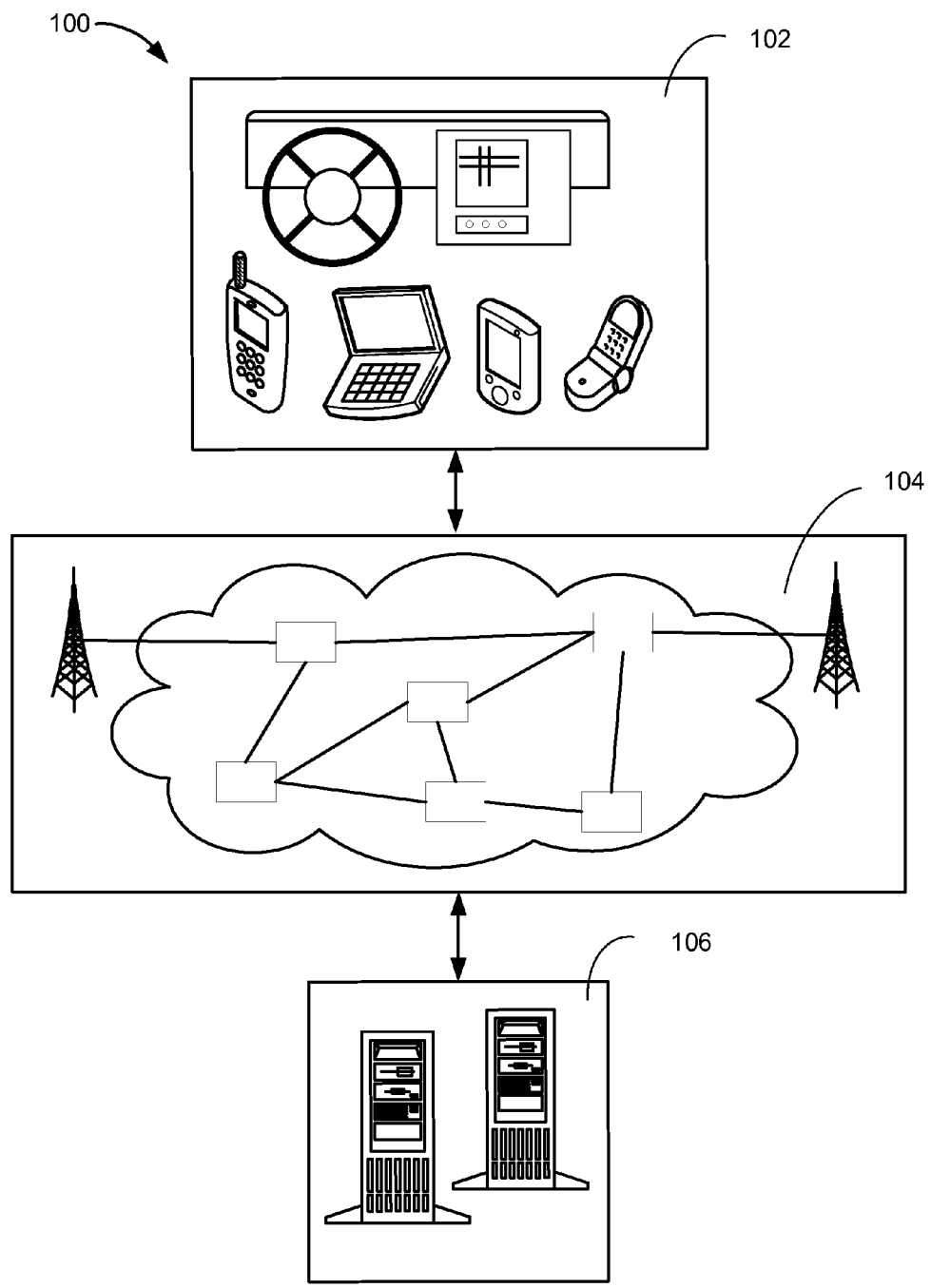
FIG. 1 is a navigation system with non-native dynamic navigator mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with non-native dynamic navigator mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
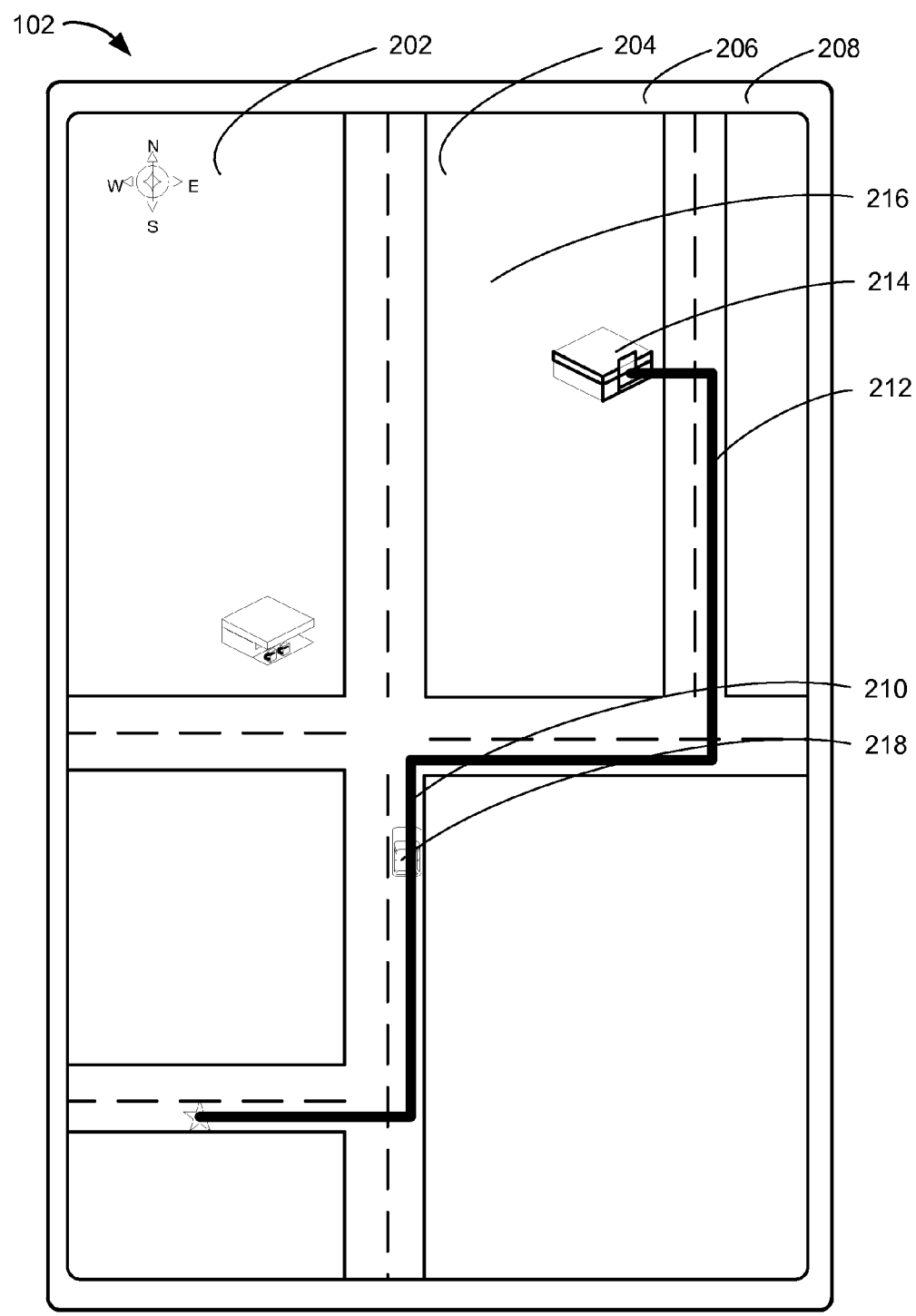
FIG. 2 is an example of a display on a display interface of the first device.

Referring now to FIG. 2, therein is shown an example of a display on a display interface 202 of the first device 102. The display interface 202 depicts a non-native dynamic navigator 216 in the context of a native application 208. The non-native dynamic navigator 216 makes a navigation session 204 contained in a native application session 206 possible, which in turn let the user continue working with the native application 208 without losing track of the native application session 206 after the navigation session 204 is done.

The non-native dynamic navigator 216 is defined as a zero install, turn-by-turn navigation application architected to run in the native application 208. The non-native dynamic navigator 216 does not require interaction from the user to install and is not installed on the first device 102. Instead, the non-native dynamic navigator 216 is delivered over to the first device 102 and uses client-side and server-side processing to provide a non-native dynamic navigation 210 experience within a native application 208. The non-native dynamic navigator 216 is launched in the context of the native application 208 at runtime without application installation for the non-native dynamic navigator 216.

The native application 208 is defined as an application that is either pre-installed on device during manufacture, or downloaded from various software distribution platforms and installed on the device. The native application 208 can be a web browser, a Microsoft Word (™), and an Adobe Acrobat (™), not originally designed for providing the navigation session 204. The computing system 100 can run the non-native dynamic navigator 216 for providing the turn-by-turn navigation application through the native application 208 without installing an instance of the turn-by-turn navigation application or without using an existing instance thereof.

The non-native dynamic navigator 216 receives a destination 214 for representing a geographical location. This in turn initializes and loads navigation widget from a server, and provides a navigation page after sufficient requirements for Authentication & Authorization are met. The navigation system 100 of FIG. 1 having a non-native dynamic navigator 216 can be loaded in the context of many applications, including Ads application, publisher application and business review application. Staying within the native application session 206 during the navigation session 204 provides a good user experience that let user to go back to the original native application 208 without losing track of it.

Once the user chooses to push start the navigation session 204, the navigation system 100 will guide the user to the destination 214 by providing the non-native dynamic navigation 210 based on a current location 218 and a route 212, including a geographical route, for providing real-time guidance for the user in physically traversing along the geographical route to the destination 214, the route 212 calculated by the navigation system 100. Alerts are sent out for when configured geofence has been penetrated by the user.

Figure 3:
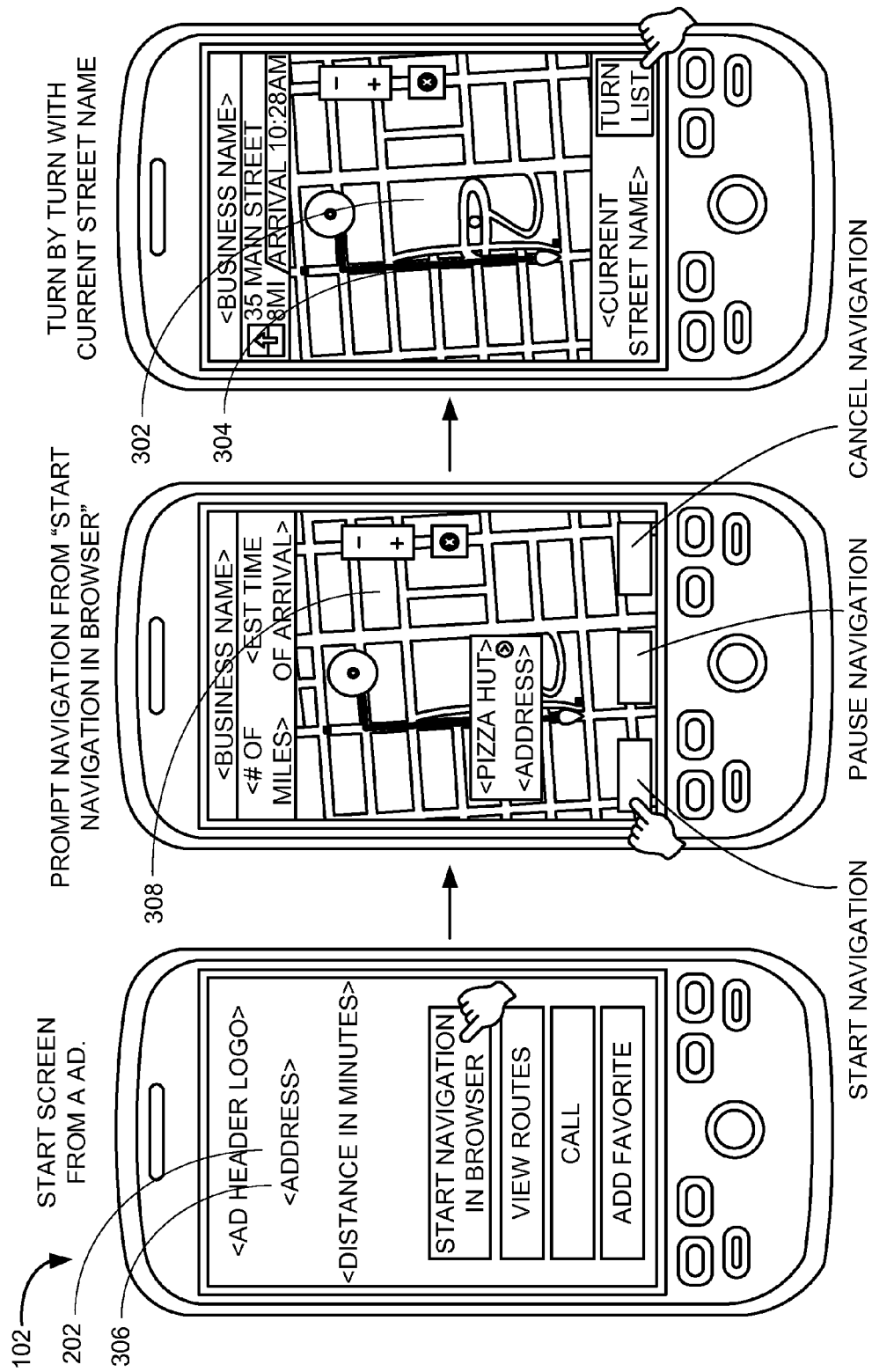
FIG. 3 is example displays of the navigation system on a display interface of the first device.

Referring now to FIG. 3, therein is shown example displays of the navigation system 100 of FIG. 1 on a display interface 202 of the first device 102. FIG. 3 depicts the non-native dynamic navigator 216 of FIG. 2 in the context of an Ad Publisher context. In this context, application developers can choose to display Mobile location sensitive Ad inside their mobile application or mobile-web application.

The basic requirements of Turn-by-Turn navigation is the need to guide the user during the navigation session 204 of FIG. 2 using early warning signals with visual-audio prompts prior to arriving at a location or ahead of time for performing a maneuver to follow the route 212 of FIG. 2. The navigation system 100 detects deviations from the route 212, which in turn often guide users back to the destination 214 of FIG. 2.

As an example, the user that would intend to drive to the location of the Ad or event would be able to do so by clicking on the "Drive To" button or a link without leaving a browser session 306, which is an example of the native application session 206 of FIG. 2. This in turn initializes and loads navigation widget from a server, provides a browser-based dynamic navigation 304, which is an example of the non-native dynamic navigator 216, after sufficient requirements for Authentication & Authorization are met.

The browser-based dynamic navigator 302 can be loaded in the context of many applications including Ads application, business review application. Staying within the browser session 306 during the navigation session 204 let user to go back to the original page in the browser 308, which is an example of the native application 208 of FIG. 2 and can be using HTML5 technology.

Also for example, the browser-based dynamic navigator 302 can be based on the HTML5 geolocation and Canvas using JavaScript as the dynamic scripting language. The browser-based dynamic navigator 302 is built to read a GPS location, leverage an off board service to generate the route 212 and provide the browser-based dynamic navigation 304. By leveraging real-time updates from the geolocation API, the JavaScript based guidance engine running within the browser 308 that is pre-loaded into mobile platform can guide a user along a given path.

The client-server communication between the first device 102 and the second device 106 of FIG. 1 with the navigation system 100 can be based on HTTP protocol, REST, and JSON technology. For example, the Java Script Components of the browser-based dynamic navigator 302 can communicate with the server using HTTP protocol and REST based service invocations. JSON can be used for data-interchange. The navigation system 100 has the capability to switch between different interchange formats. The first device 102 can have functionality to poll for data from the server or the second device 106 and to be notified by the server or the second device 106.

Figure 4:
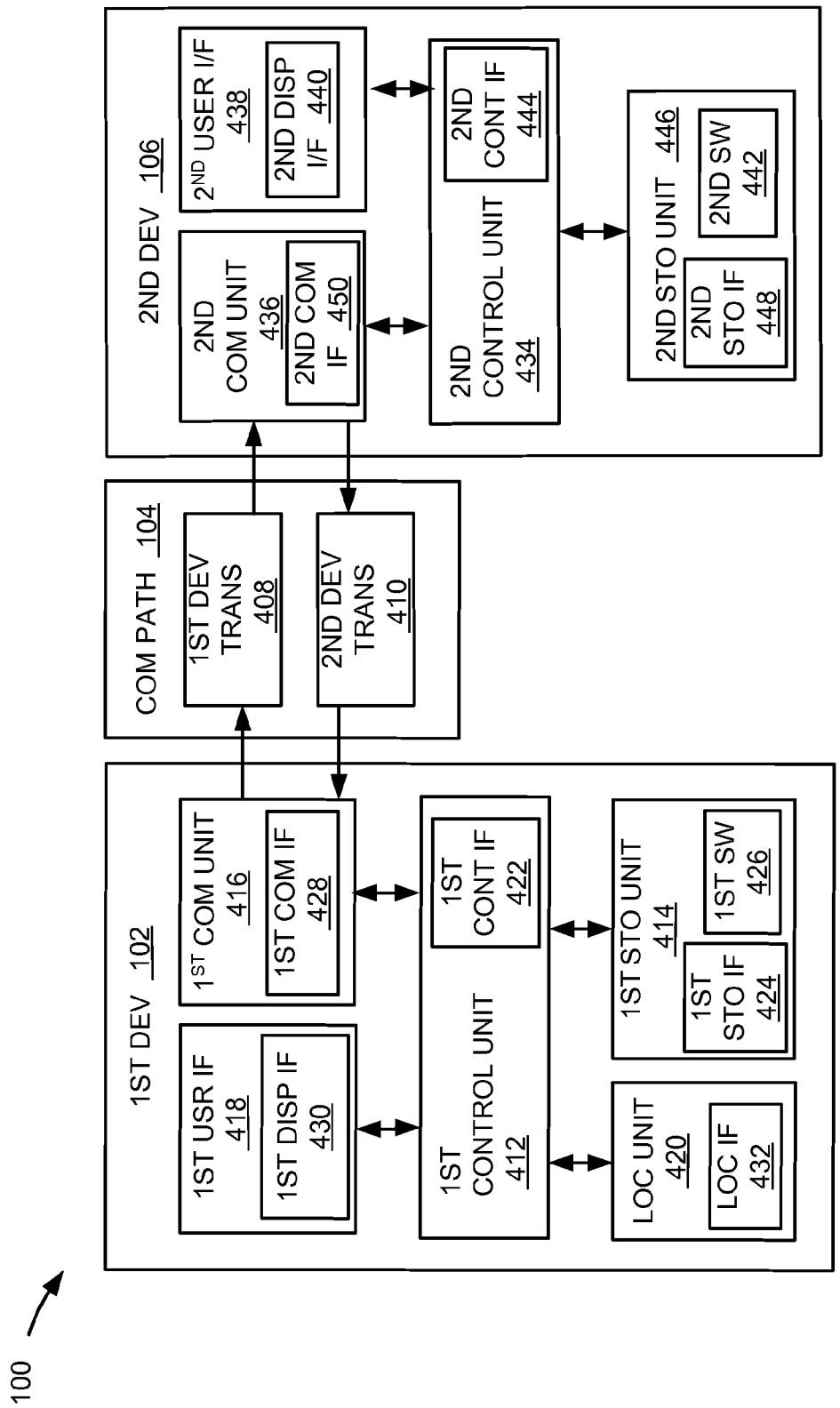
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 5 for clarity.

The functional units in the first device 102 can work individually and independently of the other functional units.

The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
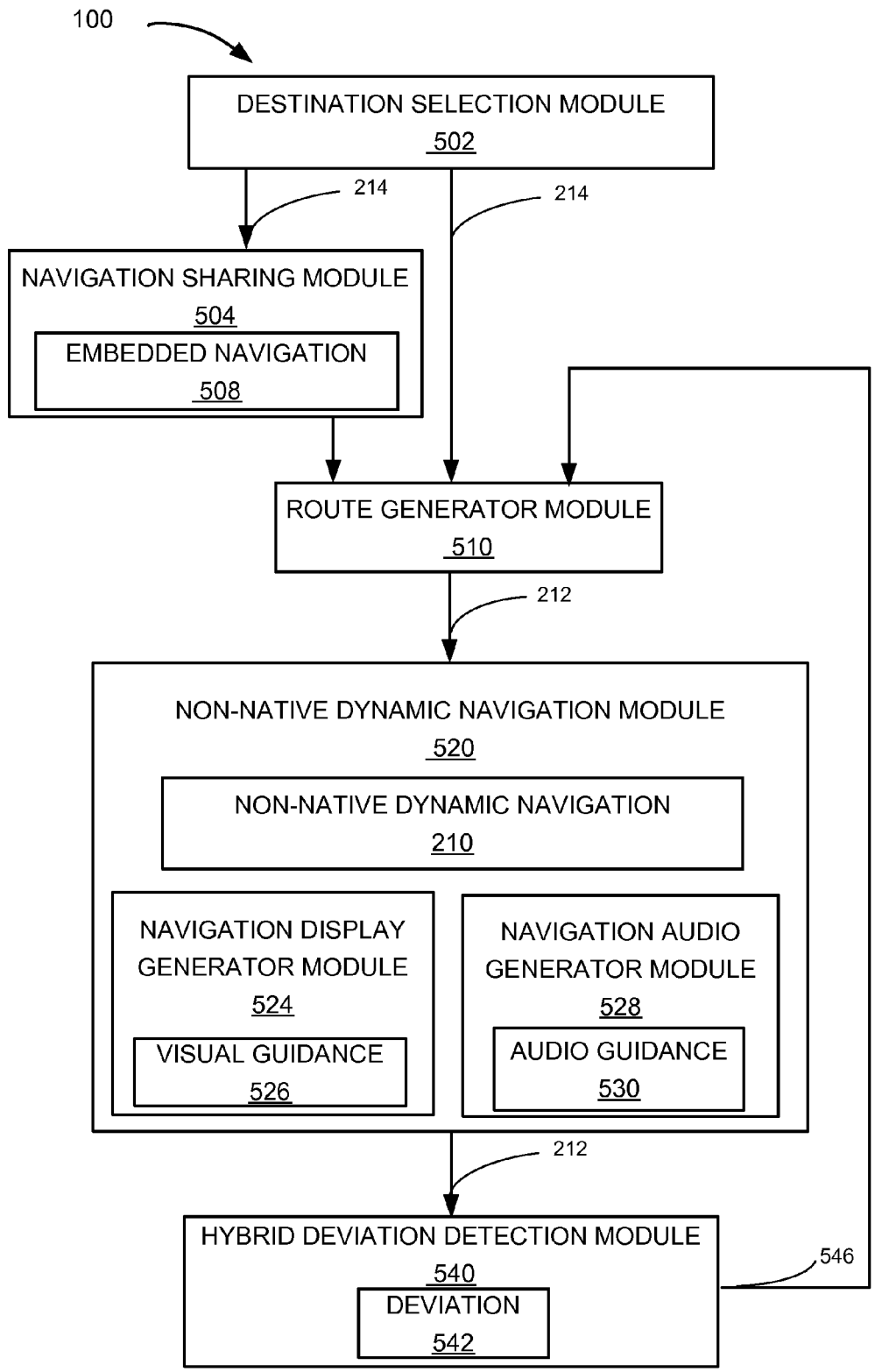
FIG. 5 is a control flow of the navigation system.

Referring now to FIG. 5, therein is shown a control flow of the navigation system 100. The navigation system 100 can include a destination selection module 502. The destination selection module 502 receives the destination 214 for the navigation session 204 of FIG. 2.

The navigation system 100 can also include a navigation sharing module 504, coupled to the destination selection module 502. The navigation sharing module 504 shares an embedded navigation 508 for driving to the destination 214 using the non-native dynamic navigation 210. The embedded navigation 508 is defined as an activation feature for invoking the navigation session 204 with the non-native dynamic navigation 210. Examples of the embedded navigation 508 can be a link, a browser widget, or an activation button. The navigation sharing module 504 can be coupled to the route generator module 510. The process of the navigation sharing module 504 will be detailed later in the specification.

The navigation system 100 can also include a route generator module 510, coupled to the destination selection module 502. The route generator module 510 generates the route 212 to the destination 214 selected, and regenerates the route 212 from a new origin 546 to the destination 214 when a deviation 542 is detected.

The navigation system 100 can also include a non-native dynamic navigation module 520, coupled to the route generator module 510. The non-native dynamic navigation module 520 generates the non-native dynamic navigation 210, including a visual guidance 526, an audio guidance 530, or a combination thereof based on the route 212 from the route generator module 510 or from the embedded navigation 508 that can include the route 212.

The non-native dynamic navigation module 520 can include a navigation display generator module 524, coupled to the route generator module 510. The navigation display generator module 524 generates the visual guidance 526 to guide user to the destination 214. The process of the navigation display generator module 524 will be detailed later in the specification.

The non-native dynamic navigation module 520 can also include a navigation audio generator module 528, coupled to the route generator module 510. The navigation audio generator module 528 generates the audio guidance 530 to guide user to the destination 214. The process of the navigation audio generator module 528 will be detailed later in the specification.

The navigation system 100 can also include a hybrid deviation detection module 540, coupled to the non-native dynamic navigation module 520. The hybrid deviation detection module 540 detects the deviation 542 from the route 212 using the first device 102 of FIG. 1 and the second device 106 of FIG. 1, which can determine a new origin 546 to re-route to the destination 214. Otherwise, the non-native dynamic navigator 216 of FIG. 2 would continue guiding the user along the route 212 to the destination 214. The process of the hybrid deviation detection module 540 will be detailed later in the specification.

The destination selection module 502 can be implemented by the navigation system 100. The destination selection module 502 can be implemented with the first control unit 412 of FIG. 4 and can make use of the first software 426 of FIG. 4, the first storage unit 414 of FIG. 4, the first communication unit 416 of FIG. 4, or some combination thereof. For example, the destination selection module 502 can receive the destination 214 and store the destination 214 in the first storage unit 414 by utilizing the first control unit 412.

For illustrative purposes, the destination selection module 502 is described as being implemented by the first control unit 412, with values being stored in the first storage unit 414, although it is understood that the destination selection module 502 can be implemented differently. For example, the destination selection module 502 can be implemented by the second control unit 434 of FIG. 4, with the destination 214 being stored in the second storage unit 446 of FIG. 4. Also for example, the second control unit 434 can generate the destination 214 and use the second communication unit 436 of FIG. 4 to send the destination 214 to the first storage unit 414.

The navigation sharing module 504 can be implemented by the navigation system 100. The navigation sharing module 504 can be implemented with the first control unit 412 and can make use of the first software 426, the first storage unit 414, the first communication unit 416, or some combination thereof. For example, the navigation sharing module 504 can receive the destination 214 and store them in the first storage unit 414 by utilizing first control unit 412.

For illustrative purposes, the navigation sharing module 504 is described as being implemented by the first control unit 412, although it is understood that the navigation sharing module 504 can be implemented differently. For example, the navigation sharing module 504 can utilize the second control unit 434 to operate the second software 442 of FIG. 4 to generate the embedded navigation 508. Also for example, the second control unit 434 can operate the second communication unit 436 to transmit the embedded navigation 508 to the second storage unit 446.

The route generator module 510 can be implemented by the navigation system 100. The route generator module 510 can be implemented by the second control unit 434, and can make use of the second storage unit 446, the second software 442, the second communication unit 436, or some combination thereof.

For example, the route generator module 510 can receive the destination 214 from the second communication unit 436 and store the destination 214 in the second storage unit 446 by utilizing the second control unit 434. The route generator module 510 can also utilize the second control unit 434 to operate the second software 442 to generate the route 212 and store the route 212 in the second storage unit 446.

For illustrative purposes, the route generator module 510 is described as being implemented by the second control unit 434, although it is understood that the route generator module 510 can be implemented differently. For example, the route generator module 510 can utilize the first control unit 412 retrieve the destination 214 from the first storage unit 414. The route generator module 510 can utilize the first control unit 412 to control the first software 426 to operate the first communication unit 416 and transit the destination 214 to the second storage unit 446.

The non-native dynamic navigation module 520 can be implemented by the navigation system 100. The non-native dynamic navigation module 520 can be implemented with the first control unit 412 and can make use of the first software 426, the first storage unit 414, the first communication unit 416, or some combination thereof. For example, the non-native dynamic navigation module 520 can receive the route 212 and store the route 212 in the first storage unit 414 by utilizing the first control unit 412.

The non-native dynamic navigation module 520 can use the first communication unit 416 to receive the route 212 from the second software 442 which can be implemented by the second control unit 434 and then store the route 212 in the first storage unit 414. The non-native dynamic navigation module 520 can utilize the first control unit 412 to operate the first software 426 to generate the non-native dynamic navigation 210, including the visual guidance 526 and the audio guidance 530, for displaying on the first device 102 of FIG. 1.

For illustrative purposes, the non-native dynamic navigation module 520 is described as being implemented by the first control unit 412, with values being stored in the first storage unit 414, although it is understood that the non-native dynamic navigation module 520 can be implemented differently. For example, the non-native dynamic navigation module 520 can be implemented by the second control unit 434, with the route 212 and the destination 214 being stored in the second storage unit 446. Also for example, the second control unit 434 can generate the non-native dynamic navigation 210 and use the second communication unit 436 to send the non-native dynamic navigation 210 to the first storage unit 414.

The hybrid deviation detection module 540 can be implemented by the navigation system 100. The hybrid deviation detection module 540 can be implemented with the first control unit 412 and can make use of the first software 426, the first storage unit 414, the first communication unit 416, or some combination thereof.

For example, the hybrid deviation detection module 540 can receive the route 212 from the non-native dynamic navigation module 520 and store the route 212 in the first storage unit 414 by utilizing the first control unit 412. Also for example, the hybrid deviation detection module 540 can utilize the first control unit 412 to operate the first software 426 to determine the deviation 542 based on the current location 218 of FIG. 2 and the route 212.

For illustrative purposes, the hybrid deviation detection module 540 is described as being implemented by the first control unit 412, although it is understood that the hybrid deviation detection module 540 can be implemented differently. For example, the hybrid deviation detection module 540 can utilize the second control unit 434 to retrieve the route 212 from the second storage unit 446. The hybrid deviation detection module 540 can utilize the second control unit 434 to control the second software 442 to operate the second display interface 440 of FIG. 4 to display the deviation 542 and prompt the user about re-route.

It has been discovered that the non-native dynamic navigation 210, the visual guidance 526, the audio guidance 530 and the non-native dynamic navigation module 520 provide a zero-install solution. There is no need for software version control or software compatibility with other applications and type of operating system the software is running on.

The modules can be implemented with hardware implementations, including hardware acceleration units (not shown) in the first control unit 412 or the second control unit 434, or separate hardware blocks (not shown)/functional units (not shown) in the first device 102 or the second device 106 of FIG. 1 outside the first control unit 412 and the second control unit 434.

Figure 6:
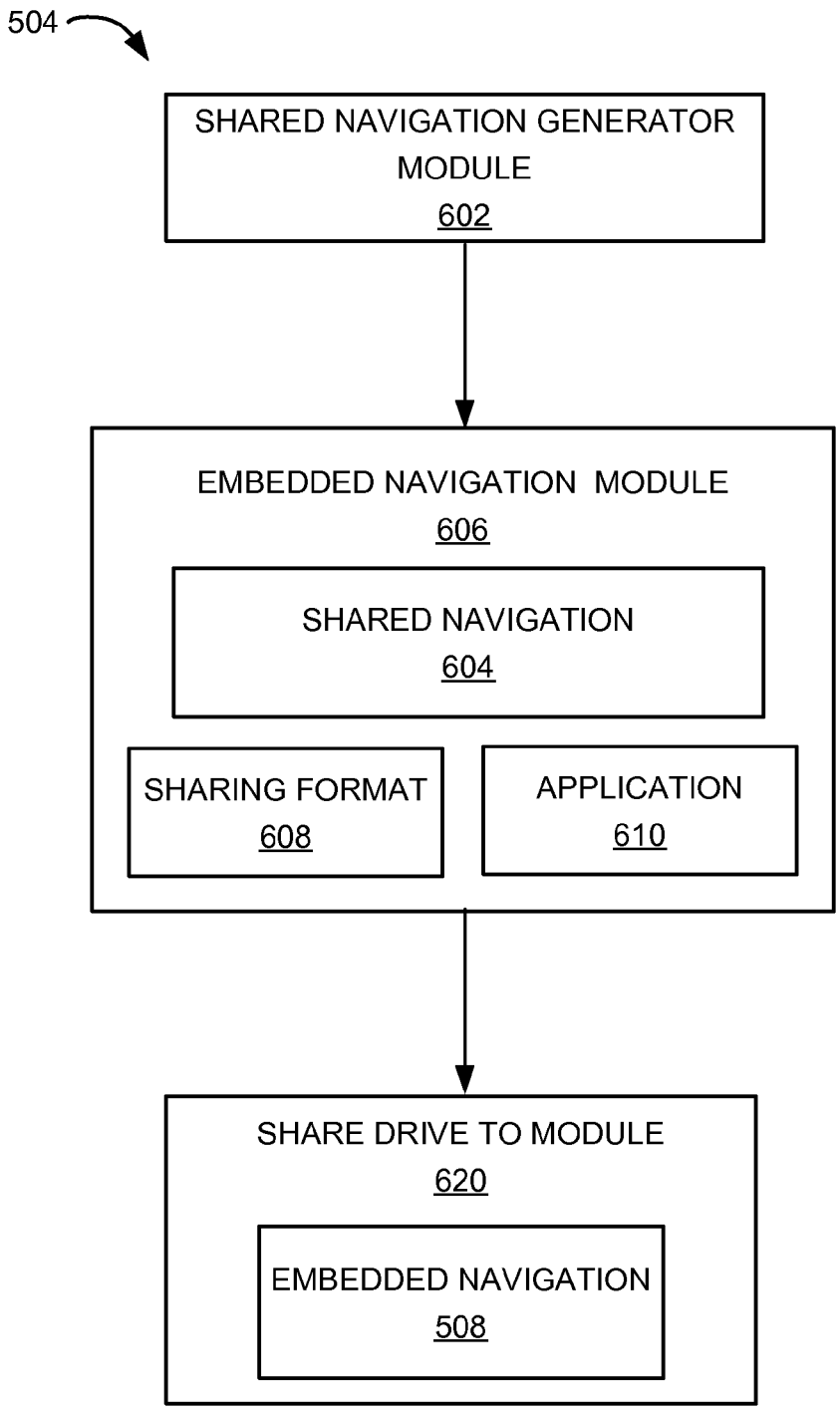
FIG. 6 is a control flow of the navigation sharing module.

Referring now to FIG. 6, therein is shown a control flow of the navigation sharing module 504. The navigation sharing module 504 generates the embedded navigation 508 by embedding a shared navigation 604 in a sharing format 608 or within an application 610, and shares the embedded navigation 508 with other user. The navigation sharing module 504 can be implemented with HTML5, JavaScript, and Java technology.

The navigation sharing module 504 shares the embedded navigation 508 with the other user through internet. When the other user clicks the embedded navigation 508 to invoke the shared navigation 604 embedded in the sharing format 608 or within the application 610, the non-native dynamic navigation 210 of FIG. 2 is launched in the context of the native application 208 of FIG. 2 at runtime without separate installation and the non-native dynamic navigation 210 is executed from within the native application session 206 of FIG. 2. For example, the sharing format 608 can be a short message service (SMS), an electronic mail (e-mail), a hyperlink, or a combination thereof. Also for example, the application 610 can be Facebook™, Twitter™, or Linkedin™.

The navigation sharing module 504 can include a shared navigation generator module 602, coupled to the destination selection module 502 of FIG. 5. The shared navigation generator module 602 generates the shared navigation 604 based on the non-native dynamic navigator 216 of FIG. 2 and the destination 214 of FIG. 2.

The shared navigation 604 is defined as a specific character string that constitutes information about the destination 214 and the non-native dynamic navigator 216. When the user clicks the shared navigation 604, the non-native dynamic navigation 210 is launched in the native application 208. For example, the shared navigation 604 can include a uniform resource locator (URL) or a link to the non-native dynamic navigator 216, address of the destination 214, latitude and longitude of the destination 214, or a combination thereof.

The navigation sharing module 504 can also include an embedded navigation module 606, coupled to the shared navigation generator module 602. The embedded navigation module 606 generates the embedded navigation 508 by embedding the shared navigation 604 in the sharing format 608 or within the application 610.

The navigation sharing module 504 can also include a share drive to module 620, coupled to the embedded navigation module 606. The share drive to module 620 shares the embedded navigation 508 with the other user for driving to the destination 214 using the non-native dynamic navigation 210.

It has been discovered that the embedded navigation 508 and the share drive to module 620 provide faster communication time by sending only the activation feature for invoking the non-native dynamic navigation 210. It has also been discovered that the sharing format 608, the application 610, the embedded navigation 508 improve user experience by sharing the embedded navigation 508 with friends in various way.

Figure 7:
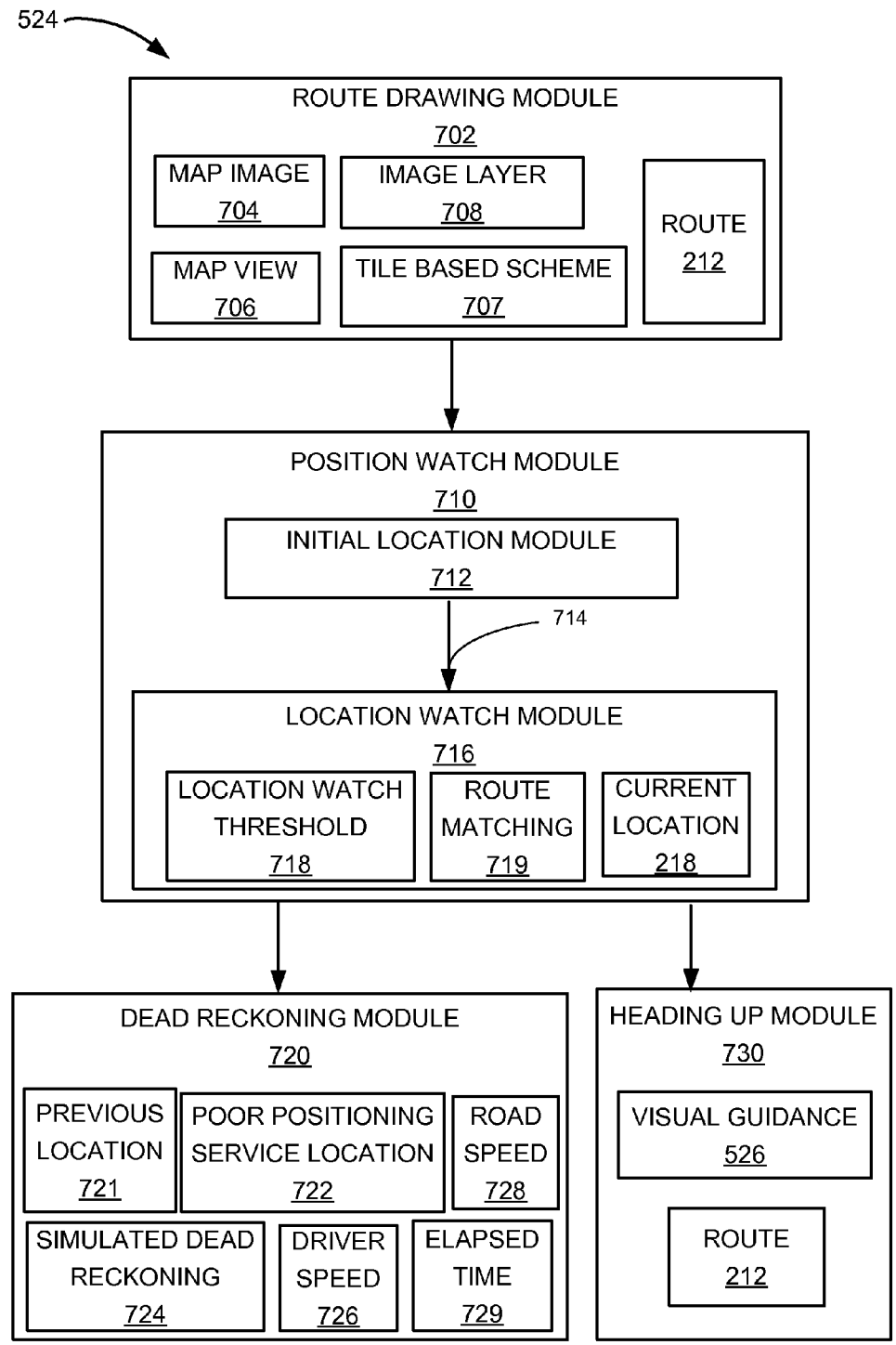
FIG. 7 is a control flow of the navigation display generator module.

Referring now to FIG. 7, therein is shown a control flow of the navigation display generator module 524. The navigation display generator module 524 generates the visual guidance 526 to guide the user during the navigation session 204 of FIG. 2 with visual prompts ahead of time. The navigation display generator module 524 can be implemented with HTML5 geolocation and canvas, JavaScript, and Java technology.

The navigation display generator module 524 can include a route drawing module 702, coupled to the route generator module 510 of FIG. 5. The route drawing module 702 receives a map image 704, generates a map view 706 using a tile-based scheme 707 based on the map image 704 and an image layer 708, and dynamically draws the route 212, on the top of the map view 706.

For example, the HTML5 canvas element can be used by the non-native dynamic navigator 216 of FIG. 2 to plot the map view 706 on the browser screen or the native application 208 of FIG. 2, which in turn helps to plot the route 212 and the current location 218 on the top of the map view 706.

Also for example, the map view 706 can constitute the image layer 708 and the map view 706 can be imposed with a base maps layer, a decoration layer, a traffic layer, and a controls layer. The process of drawing the base maps layer is based on the map image 704 by using the tile based scheme 707. The map image 704 is defined as an image without any map attributes, roads, coordinates, point of interest information, and retrieved based on the current zoom level from the second device 106 of FIG. 2 using communication mechanism.

It has been discovered that the map image 704 provides faster communication time between the first device 102 and the second device 106 by using the map image 704, which is light weighted and has no map attributes, roads, coordinates, point of interest information. The map image 704 also provides decreased storage space and faster execution time when loaded into the native application 208.

The navigation display generator module 524 can include a position watch module 710, coupled to the route drawing module 702. The position watch module 710 determines the current location 218 of the first device 102 of FIG. 1 by using a route matching 719 based on the route 212, and a location watch threshold 718.

For example, the current location 218 can be determined using HTML5 single point geolocation, the route 212, and the location watch threshold 718. The latitude and longitude can be available to JavaScript on the page displaying the map image 704 and the route 212. The second device 106 can provide other map attributes not found in the map image 704 and examples of other map attributes include location-aware items, such as finding local businesses or showing location information. The geolocation can be a single point geolocation determined by HTML5 geolocation, the location watch threshold 718 can be a radius in meters.

The position watch module 710 can include an initial location module 712. The initial location module 712 generates an initial location 714 that is the single point location using geolocation.

The initial location 714 perhaps cannot be used directly for navigation due to inconsistencies with several measurements sent by the native application 208. The inconsistencies generated by the native application 208 include accuracy of the geolocation, heading to direction, and speed of the first device 102.

The position watch module 710 can also include a location watch module 716, coupled to the initial location module 712. The location watch module 716 generates the current location 218 by using the route matching 719 based on the route 212 and the location watch threshold 718. The initial location 714 is filtered and optimized through a number of different ways, and the current location 218 generated by the location watch module 716 is sent to the respective components of the non-native dynamic navigator 216 of FIG. 2.

The location watch module 716 can leverage a number of different elements in its context to deliver an accurate representation of the user's current location 218. The location sensors, such as the location unit 420, can have an inherent characteristic of error that may be significant—especially in the context of a navigation solution. While the platform location applications themselves provide precision capabilities, it does not necessarily reflect accuracy—they may be inaccurate by upwards of several 100 meters. Several hundred meter inaccuracies can lead to a very poor navigation implementation including inaccurate positioning that may lead to false route deviations and rerouting, invalid triggering of guidance events and inaccurate route generation.

To address these concerns, the Location Watch Module leverages several unique insights to be able to leverage a low accuracy location position for a navigation solution that requires high precision. For example, the location watch module 716 can first filter the initial location 714 based on the distance between two fixed locations and a logical speed at which a vehicle could travel between the two fixed locations. Second, the location watch module 716 can filter the initial location 714 and heading of the navigation system 100 by using multiple fixed locations. Third, the location watch module 716 can further filter the initial location 714 by associating the initial location 714 with the map image 704.

The route matching 719 is defined as the mechanism that match the current location 218 with single point geolocation to the route 212 when the distance between the current location 218 and the route 212 is less than the location watch threshold 718. For example, if the position change is detected, the current location 218 can be sent to components of the browser-based dynamic navigator 302 of FIG. 3 or more generally the non-native dynamic navigator 216, such as a dead reckoning module 720, a heading up module 730, and the hybrid deviation detection module 540 of FIG. 5.

The navigation display generator module 524 can also include the dead reckoning module 720, coupled to the position watch module 710. The dead reckoning module 720 generates the visual guidance 526 using a simulated dead reckoning 724 for a poor positioning service location 722.

The poor positioning service location 722 can include a position with a poor accuracy of the positioning service signal, a position with infrequent position update, or a combination thereof. For example, the poor accuracy of the positioning service signal can be greater than 1000 meters, which makes the location with poor accuracy of the positioning service signal a coarse range location. For another example, typical position update is in every 1 second, but the infrequent position update can be in a period as long as 2 minutes, 10 minutes, or even longer.

The simulated dead reckoning 724 is defined as a process of determining a previous location 721 by assigning the current location 218 to the previous location 721, and calculating the current location 218 by using the previous location 721 and advancing the previous location 721 based on a driver speed 726 or a road speed 728 when the driver speed 726 is not available over an elapsed time 729 and the route 212. The non-native dynamic navigator 216 can predict where the user is on the road every 1 second using the simulated dead reckoning 724.

The navigation display generator module 524 can also include the heading up module 730, coupled to the position watch module 710. The heading up module 730 generates the visual guidance 526 with heading up by rotating the map image 704 based on the current location 218 and the route 212. For example, the non-native dynamic navigator 216 can use Canvas to get map rotation and HTML5 geolocation to get the current location 218. The visual guidance 526 with heading up let the user has a better driving experience than the traditional north up map.

Figure 8:
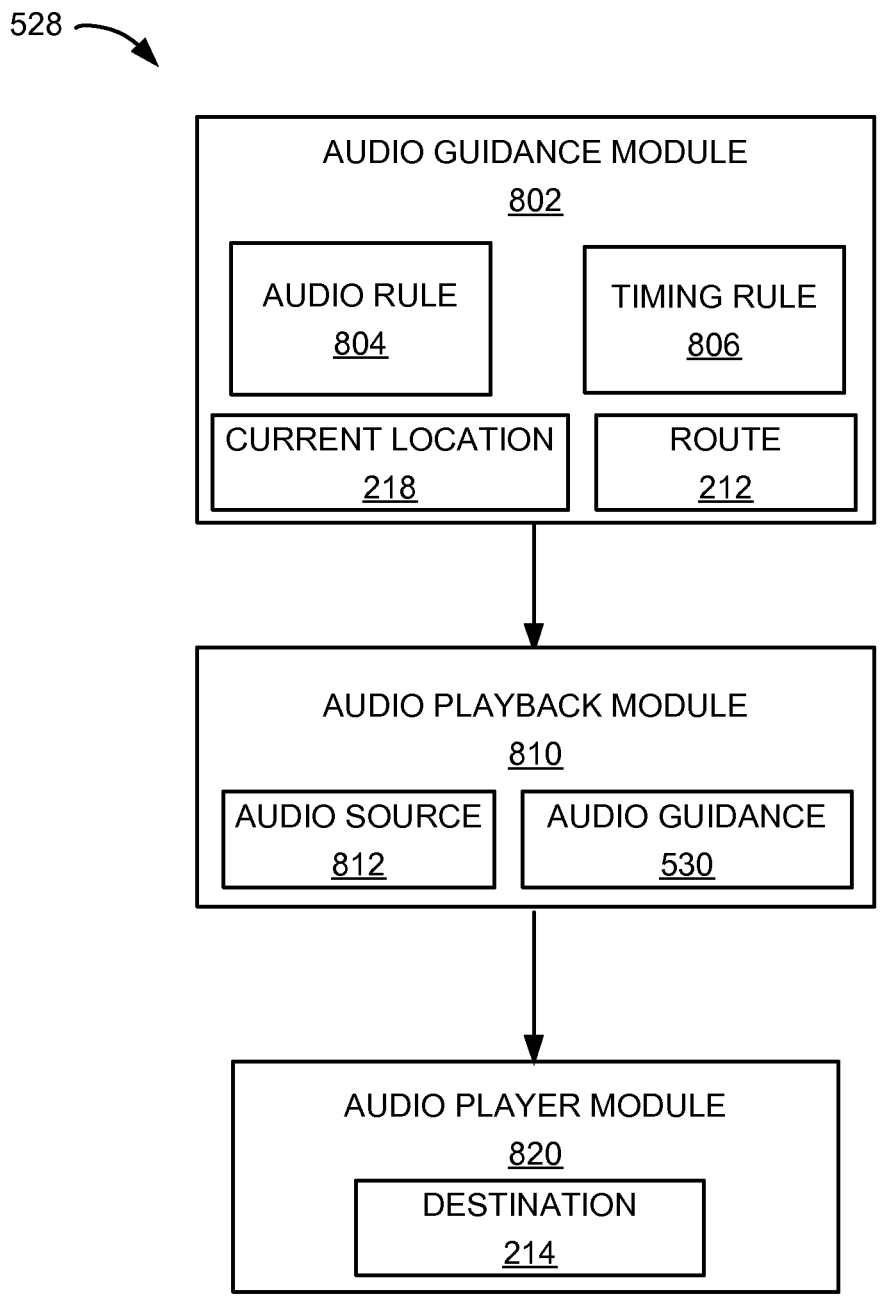
FIG. 8 is a control flow of the navigation audio generator module.

Referring now to FIG. 8, therein is shown a control flow of the navigation audio generator module 528. The navigation audio generator module 528 generates the audio guidance 530 at real time to play and orchestrates a series of events that need to happen before maneuvers to navigate the user to the destination 214. The navigation audio generator module 528 can be implemented with HTML5, JavaScript and Java technology.

For example, the HTML5 Specification has furnished a way for web applications to play media with video and audio tags. The Navigation client extends the use of this feature for various platforms. Some platforms for the first device 102 of FIG. 1 only allow the audio guidance 530 to play once. The navigation system 100 of FIG. 1 has work-around to support audio playback during the navigation session 204 of FIG. 2.

The navigation audio generator module 528 can include an audio guidance module 802, coupled to the route generator module 510 of FIG. 5. The audio guidance module 802 generates the audio guidance 530 by combining the information from an audio rule 804, a timing rule 806, the current location 218, the map image 704, and the route 212.

The audio rule 804 is defined as a rule that concatenates a turn and a distance related audio bytes based on rules in many formats. For example, the audio rule 804 can be in MP3 or OGG format for efficient streaming and manipulation of high quality digital multimedia.

The timing rule 806 is defined as the rule that controls when to play the audio guidance 530 based on back and forth delay which is about a few seconds between first device 102 and second device 106 of FIG. 1, the length of the audio guidance 530, the position prediction, the distance difference between highway and local road to have enough time to play the audio guidance 530.

The navigation audio generator module 528 can also include an audio playback module 810, coupled to the audio guidance module 802. The audio playback module 810 updates an audio source 812 multiple times by assigning the audio guidance 530 frequently.

For example, the audio playback module 810 generates work-round to fix the playing once problem from android based smartphone, such as iPhone™, by frequently swapping the audio source 812 and triggering audio event to play the audio guidance 530 multiple times based on the current location 218 and the timing rule 806. The playing once problem is caused by the issue that native audio tag in HTML5 can only play once.

The navigation audio generator module 528 can also include an audio player module 820, coupled to the audio playback module 810. The audio player module 820 prompts the audio guidance 530 multiple times by triggering the audio source 812 ahead of time to navigate the user to the destination 214 selected.

For example, there can be three prompts, including an information prompt, a preparation prompt and a play prompt, that happen before the user actually makes a turn. The information prompt can happen a few miles before the user next turn. The preparation prompt can happen 0.1 mile before the user next turn and is to warn the user that the turn is going to happen soon. The play prompt is for a turn happening right now.

Figure 9:
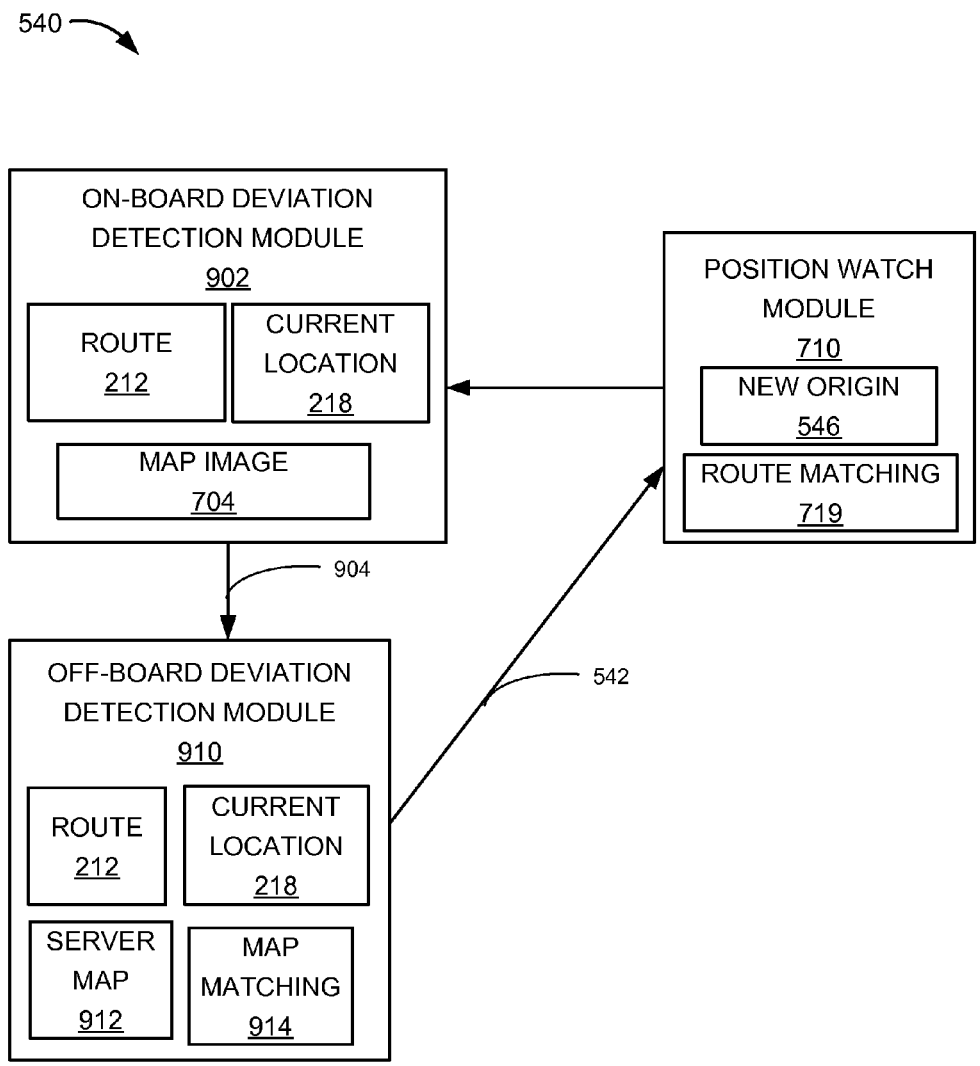
FIG. 9 is a control flow of the hybrid deviation detection module.

Referring now to FIG. 9, therein is shown a control flow of the hybrid deviation detection module 540. The hybrid deviation detection module 540 determines the deviation 542 from the route 212 by using the first device 102 of FIG. 1 and the second device 106 of FIG. 1, and generates the new origin 546 to re-route to the destination 214 of FIG. 2 when the deviation 542 is detected. Otherwise, the navigation system 100 of FIG. 1 would guide the user to the destination 214 through the navigation session 204 of FIG. 2. The hybrid deviation detection module 540 can be implemented with HTML5, JavaScript and Java technology.

The hybrid deviation detection module 540 can include the position watch module 710, coupled to the non-native dynamic navigation module 520 of FIG. 5. The position watch module 710 generates the current location 218 for the navigation system 100 using the route matching 719, and generates the new origin 546 by assigning the current location 218 when the deviation 542 is detected.

The hybrid deviation detection module 540 can also include an on-board deviation detection module 902, coupled to the position watch module 710. The on-board deviation detection module 902 monitors the current location 218 and the route 212 being overlaid onto the map image 704 which is stored on-board, and detects an on-board deviation 904 when the distance from the current location 218 to the route 212 is more than the location watch threshold 718 of FIG. 7. The map image 704 stored on the first device 102 can be retrieved from the second device 106, but the map image 704 does not contain as much information as a server map 912, which includes map attributes, roads, coordinates, point of interest information. It is understood that the error size of the on-board deviation 904 can be in meters.

The hybrid deviation detection module 540 can also include an off-board deviation detection module 910, coupled to the on-board deviation detection module 902. The off-board deviation detection module 910 detects the deviation 542 using a map matching 914 based on the server map 912, which is off-board, the current location 218, and the route 212 when the on-board deviation 904 is detected.

The map matching 914 is defined as a mechanism that determines the deviation 542 when the current location 218 is not on the correct road of the server map 912 based on the route 212. For example, if the on-board deviation 904 is detected, which in turn can request the off-board deviation detection module 910 to further check using the map matching 914 based on the server map 912 because the on-board information about the map image 704 is incomplete. The off-board deviation detection module 910 can determine that the on-board deviation 904 is false because there is no road on the server map 912 for the current location 218.

It has been discovered that the map image 704, the on-board deviation detection module 902, the server map 912 and the off-board deviation detection module 910 provide route reliability and accuracy for the navigation system 100 by improving the accuracy of the deviation 542 detected and re-routing to the destination 214. This in turn provides safety for the user to drive.

It has also been discovered that the non-native dynamic navigation 210 of FIG. 2 provides an efficient and easy mechanism that runs within the native application session 206 of FIG. 2 enabling the "Drive To" experience for end users by providing a unique, low-cost, zero-install and easy to integrate solution. This technology also improves user experience by running the navigation session 204 within the native application session 206. The user can keep track of the native application 208 after the navigation session 204 is done.

The physical transformation from displaying the non-native dynamic navigation 210 results in movement in the physical world, such as people using the first device 102, the vehicle, or a combination thereof, based on the operation of the navigation system 100. As the movement in the physical world occurs, the movement itself creates additional information that is converted back to the current location 218 for the continued operation of the navigation system 100 and to continue the movement in the physical world.

The navigation system 100 describes the module functions or order as an example. The modules can be partitioned differently. For example, the destination selection module 502 of FIG. 5 and the navigation sharing module 504 of FIG. 5 can be combined. Each of the modules can operate individually and independently of the other modules.

Furthermore, data generated in one module can be used by another module without being directly coupled to each other. For example, the hybrid deviation detection module 540 can receive the route 212 from the route generator module 510 of FIG. 5.

Figure 10:
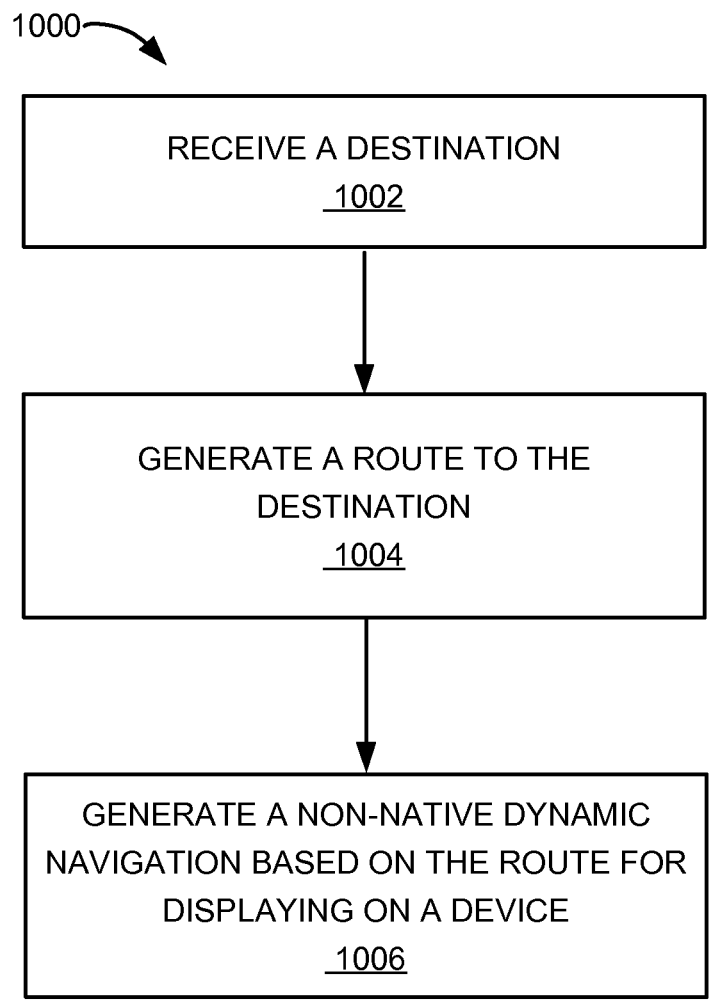
FIG. 10 is a flow chart of a method of operation of the navigation system in a further embodiment of the present invention.

Referring now to FIG. 10, therein is shown a flow chart of a method 1000 of operation of the navigation system 100 of FIG. 1 in a further embodiment of the present invention. The method 1000 includes: receiving a destination in a block 1002; generating a route to the destination in a block 1004; and generating a non-native dynamic navigation based on the route for displaying on a device in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising: receiving a destination for representing a geographical location;
    sharing an embedded navigation for driving to the destination using a device and a non-native dynamic navigation relative to the device; wherein the embedded navigation is defined as an activation feature that invokes the non-native dynamic navigation,
    generating a geographical route to the destination;
    generating the non-native dynamic navigation with a control unit including a visual guidance and an audio guidance, based on the geographical route; communicating the non-native dynamic navigation for a turn by turn navigation application using a web browser and the device and without installing the turn-by-turn navigation application on neither the web browser nor the device, the turn-by-turn navigation application for providing real-time guidance to a user along the geographical route to the destination;
    detecting a deviation from the geographical route using a map matching to re-route from a new origin to the destination; wherein generating the non-native dynamic navigation includes:
    drawing the geographical route on a map view generated using a tile based scheme based on a map image and an image layer; generating a current location by using a route matching based on the geographical route and a location watch threshold:
    generating the visual guidance with heading up by rotating the map image based on the current location and, the geographical route; and
    generating the visual guidance by using a simulated dead reckoning for a poor positioning service location based on the geographical route, advancing a previous location based on a driver or a road speed when the driver speed is not available over an elapsed time and the geographical route.

2. The method as claimed in claim 1 wherein generating the non-native dynamic navigation includes:
    generating the audio guidance for the non-native dynamic navigation based on an audio rule, a timing rule, a current location, a map image and the geographical route;
    updating an audio source multiple time by assigning the audio guidance frequently; and
    prompting the audio guidance multiple of time by triggering the audio source ahead of time to navigate to the destination.

3. The method as claimed in claim 1 wherein sharing the embedded navigation includes:
    generating a shared navigation based on a non-native dynamic navigator and the destination;
    generating the embedded navigation by embedding the shared navigation in a sharing format or within an application; and
    sharing the embedded navigation for driving to the destination using the non-native dynamic navigation.

4. The method as claimed in claim 1 wherein detecting the deviation from the geographical route includes:
    generating a current location by using a route matching;
    detecting an on-board deviation by monitoring the current location and the geographical route based on a map image and the geographical route;
    detecting a deviation using a map matching based on the current location, a server map and the geographical route when the on-board deviation is detected; and
    generating a new origin to re-route to the destination when the deviation is detected.

5. A navigation system comprising:
    a control unit including one or more processors configured to:
    receive a destination for representing a geographical location;
    share an embedded navigation for driving to the destination using a device and a non-native dynamic navigation relative to the device; wherein the embedded navigation is defined as an activation feature that invokes the non-native dynamic navigation,
    generate a geographical route to the destination;
    generate the non-native dynamic navigation based on the geographical route;

a communication unit including microelectronics, coupled to the control unit, configured to communicate the non-native dynamic navigation for providing a turn-by-turn navigation application using a web browser and the device without installing the turn-by-turn navigation application on neither the web browser nor the device, the turn-by-turn navigation application for providing real-time guidance to a user along the geographical route to the destination;

wherein the control unit is further configured to:

detect a deviation from the geographical route using a map matching to re-route from a new origin to the destination; draw the geographical route on a map view generated using a tile based scheme based on a map image and an image layer;

generate a current location by using a route matching based on the geographical route and a location watch threshold;

generate the visual guidance with heading up by rotating the map image based on the current location and the geographical route, and generate the visual guidance by using a simulated dead reckoning for a poor positioning service location based on the geographical route, advancing a previous location based on a driver speed or a road speed when the driver speed is not available over an elapsed time and the geographical route.

6. The system as claimed in claim 5 wherein the control unit is configured to:

generate the audio guidance for the non-native dynamic navigation based on an audio rule, a timing rule, a current location, a map image and the geographical route;

update an audio source multiple time by assigning the audio guidance frequently; and prompt the audio guidance multiple of time by triggering the audio source ahead of time to navigate to the destination.

7. The system as claimed in claim 5 wherein the control unit is configured to:

generate a shared navigation based on a non-native dynamic navigator and the destination together;

generate the embedded navigation by embedding the shared navigation in a sharing format or within an application; and share the embedded navigation for driving to the destination using the non-native dynamic navigation.

8. The system as claimed in claim 5 wherein the control unit is configured to:

generate a current location by using a route matching and generating a new origin to re-route to the destination when a deviation is detected;

detect an on-board deviation by monitoring the current location and the geographical route based on a map image and the geographical route; and detect the deviation using a map matching based on the current location, a server map and the geographical route when the on-board deviation is detected.

\* \* \* \* \*